(12) United States Patent
Kim et al.

(10) Patent No.: US 8,527,642 B2
(45) Date of Patent: Sep. 3, 2013

(54) METHOD AND APPARATUS FOR ADVERTISING SERVICE IN PERSONALIZED MANNER IN NEXT-GENERATION COMMUNICATION NETWORK

(75) Inventors: Jeong-hwan Kim, Daejeon-si (KR); Sang-ki Kim, Daejeon-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 241 days.

(21) Appl. No.: 12/626,091

(22) Filed: Nov. 25, 2009

(65) Prior Publication Data

US 2010/0161812 A1 Jun. 24, 2010

(30) Foreign Application Priority Data

Dec. 19, 2008 (KR) ........................ 10-2008-0130679

(51) Int. Cl.
*G06F 15/16* (2006.01)

(52) U.S. Cl.
USPC .......................................... 709/228; 709/221

(58) Field of Classification Search
USPC ................. 709/228, 227, 229, 205, 220–222; 719/318
See application file for complete search history.

(56) References Cited

U.S. PATENT DOCUMENTS

| 7,426,485 B1 * | 9/2008 | Lobo et al. ...................... 705/28 |
| 7,797,428 B2 | 9/2010 | Jung et al. |
| 2004/0128344 A1 * | 7/2004 | Trossen ........................ 709/203 |
| 2004/0255302 A1 * | 12/2004 | Trossen ........................ 719/318 |
| 2006/0136395 A1 * | 6/2006 | Rhee et al. ........................ 707/3 |
| 2007/0127686 A1 | 6/2007 | Song et al. |
| 2009/0125628 A1 * | 5/2009 | Dahlen ........................ 709/227 |
| 2010/0325275 A1 * | 12/2010 | Van Elburg et al. .......... 709/225 |

FOREIGN PATENT DOCUMENTS

| KR | 10-2005-0046182 | 5/2005 |
| KR | 10-2007-0051234 | 5/2007 |
| KR | 10-2007-0051236 | 5/2007 |
| KR | 10-2008-0050298 | 5/2008 |

OTHER PUBLICATIONS

Camarillo et al., RFC5002 the Session Initiation Protocol (SIP) P-Profile-Key Private Header (P-Header), Aug. 2007, IETF, tools.ietf.org/html/rfc5002).*

* cited by examiner

*Primary Examiner* — Ruolei Zong
(74) *Attorney, Agent, or Firm* — Staas & Halsey LLP (57) ABSTRACT

Provided are a method and apparatus for advertising a service in a personalized manner in a next-generation communication network. The method includes: receiving new service registration information, which indicates that a new service has been registered, from a service registration server; mapping the received new service registration information to service profiles included in pre-stored subscription information of a plurality of subscriber terminals and selecting a subscriber terminal which is related to the new service registration information; and identifying whether the selected subscriber terminal is subscribed to a new service notification event of a home subscriber server and sending advertising information of the new service, which is related to the new service registration information, to the selected subscriber terminal with reference to subscription information of the selected subscriber terminal.

12 Claims, 6 Drawing Sheets

```
<?xml version="1.0" encoding="UTF-9"?>
  <serviceInformation>
    <general Stuff>
       <name>Location-based Tour Information Service</name>
       <description> This service provides information to access .... </description>
       <category> Tour information </category>
       <chargingInfo> Free </chargingInfo>
    </generalStuff>
    ...
    <serviceAccess>
       <method> HTTP </method>
       <accessURI> http://localtour.impact.com </accessURI>
    </serviceAccess>
  </serviceInformation>
```

FIG.6

METHOD AND APPARATUS FOR ADVERTISING SERVICE IN PERSONALIZED MANNER IN NEXT-GENERATION COMMUNICATION NETWORK

CROSS-REFERENCE TO RELATED APPLICATION

This application claims the benefit under 35 U.S.C. §119 (a) of Korean Patent Application No. 10-2008-0130679, filed on Dec. 19, 2008, the disclosure of which is incorporated by reference in its entirety for all purposes.

BACKGROUND

1. Field

The following description relates to next-generation communication network service technology, and more particularly, to a method and apparatus for advertising a service in a personalized manner in a next-generation communication network.

2. Description of the Related Art

The next-generation of communication systems are currently being evolved to provide subscribers with personalized services through mobile terminals of the subscribers in view of their situation. An example of such a next-generation communication system is an Internet protocol multimedia subsystem (IMS). An IMS is a system for providing IP-based packet communication services and has been developed by the $3^{rd}$ Generation Partnership Project (3GPP) as an open standard to deliver multimedia services to mobile clients in a packet domain.

That is, when a new service is introduced into a network, an IMS sends advertising information of the new service to mobile terminals of a large number of subscribers so as to induce the subscribers to use the new service through their mobile terminals.

However, the IMS using this service advertising method randomly provides or broadcasts advertising information of a new service to mobile terminals of a large number of unspecified subscribers without considering the situations or characteristics of the subscribers. Thus, new services are advertised in a very inefficient manner. Furthermore, subscribers often fail to use really necessary services since advertising information of many unwanted services is sent to their mobile terminals.

SUMMARY

It is an objective of the present invention to provide a service in view of subscribers' situations, preferences, and dispositions.

It is another objective of the present invention to enable only those subscribers, who are suitable for a newly generated service, to access the newly generated service.

It is another objective of the present invention to maximize service advertising efficiency by providing advertising information of a service in view of subscribers' situations, preferences, and dispositions.

According to an exemplary aspect, there is provided a method of advertising a new service. The method includes: receiving new service registration information, which indicates that a new service has been registered, from a service registration server; mapping the received new service registration information to service profiles included in pre-stored subscription information of a plurality of subscriber terminals and selecting a subscriber terminal which is related to the new service registration information; and identifying whether the selected subscriber terminal is subscribed to a new service notification event of a home subscriber server and sending advertising information of the new service, which is related to the new service registration information, to the selected subscriber terminal with reference to subscription information of the selected subscriber terminal.

The new service registration information includes general information which includes the name, category, description, and charging information of the new service, usage information, service description information, service category information, service owner information, and service access information.

Each service profile includes a plurality of categories, and service profiles are classified into a plurality of groups by the subscriber terminals.

Each of the subscriber terminals sets a service profile using a session initiation protocol (SIP) or a hypertext transfer protocol (HTTP).

Each of the subscriber terminals deletes or updates a service profile which was set using the SIP or the HTTP.

In the mapping of the received new service registration information, the category of the new service included in the general information of the new service registration information is matched with categories included in the service profiles which are included in the pre-stored subscription information of the subscriber terminals.

A subscriber terminal related to the new service registration information may be selected by mapping the new service registration information received from the service registration server to the service profiles set by the subscriber terminals, and the advertising information of the new service may be provided to the selected subscriber terminal.

The service access information of the new service registration information includes access information for an Internet protocol multimedia subsystem (IMS)-based application service and access information for a non-IMS-based application service, wherein, in case of the IMS-based application service, the subscriber terminal which receives the advertising information of the new service accesses an IMS application server using an SIP public service identity (PSI) and uses a service related to the advertising information of the new service.

The service access information of the new service registration information includes access information for an IMS-based application service and access information for a non-IMS-based application service, wherein, in case of the non-IMS-based application service, the subscriber terminal which receives the advertising information of the new service accesses the IMS application server using an HTTP uniform resource identifier (URI) and downloads an application program of the new service which is installed on the IMS application server.

The service access information of the new service registration information includes access information for an IMS-based application service and access information for a non-IMS-based application service, wherein, in case of the non-IMS-based application service, the subscriber terminal which receives the advertising information of the new service calls a web service using a simple object protocol (SOAP) URI and uses the new service.

The subscriber terminal, which receives the advertising information of the new service, may download an application program related to the received advertising information of the new service from the IMS application server and install the downloaded application program, irrespectively of whether the new service is an IMS-based application service or a non-IMS-based application service. Accordingly, a subscriber using the subscriber terminal may be provided with the new service related to the installed application program or may directly access and use the new service.

Other objects, features and advantages will be apparent from the following description, the drawings, and the claims.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain aspects of the invention.

DETAILED DESCRIPTION

The above and other features and advantages of the present invention will become more apparent by describing exemplary embodiments thereof with reference to the attached drawings. Exemplary embodiments of the present invention will now be described in detail so that they can be readily understood and applied by those skilled in the art.

Figure 1:
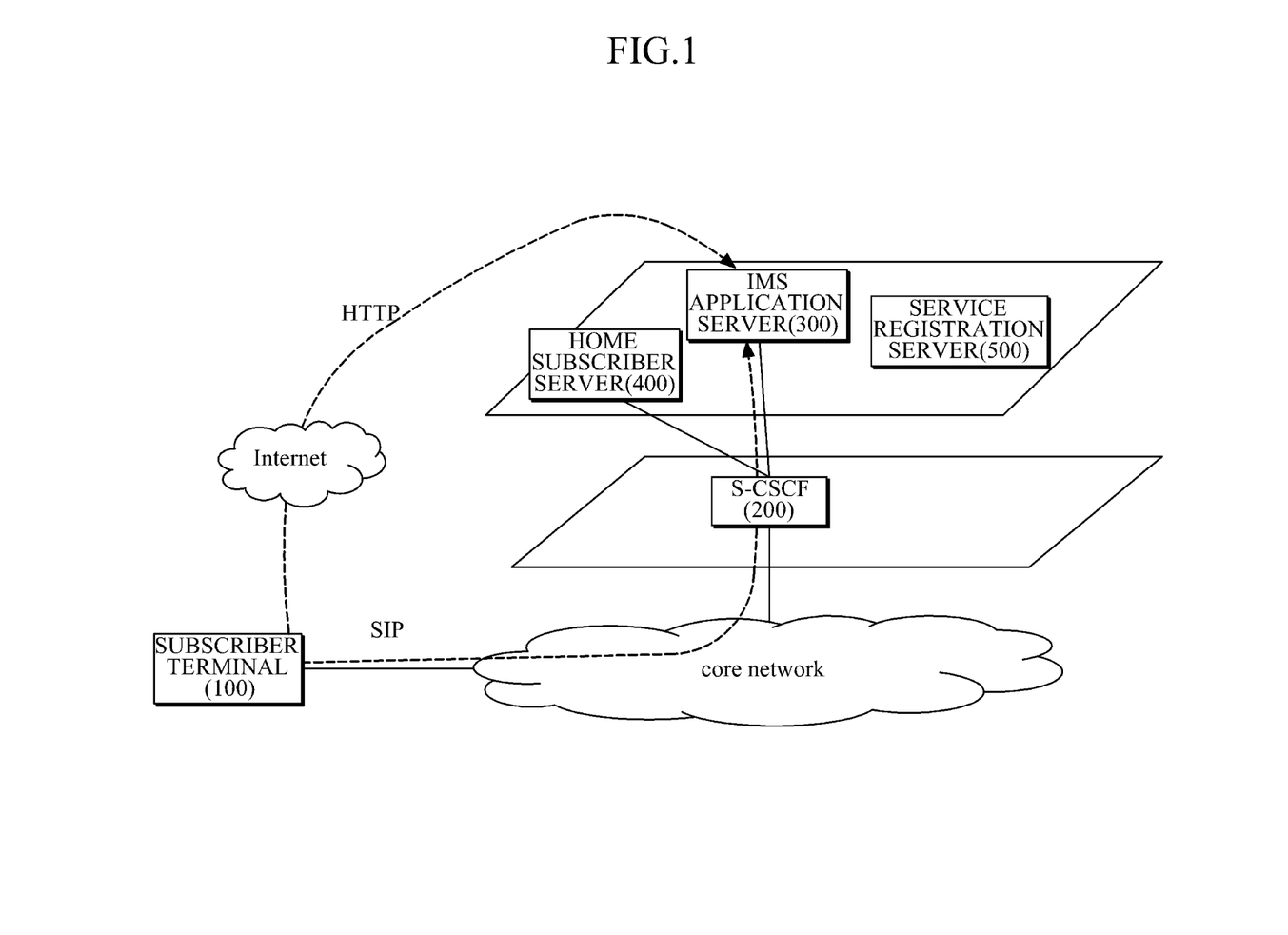
FIG. 1 illustrates the configuration of a system for advertising a service in a personalized manner in a next-generation communication network, according to an exemplary embodiment.

FIG. 1 illustrates the configuration of a system for advertising a service in a personalized manner in a next-generation communication network, according to an exemplary embodiment.

Referring to FIG. 1, the system for advertising a service in a personalized manner includes a plurality of subscriber terminals 100, a serving-call session control function (S-CSCF) 200, an IMS application server 300, a home subscriber server (HSS) 400, and a service registration server 500.

The subscriber terminals 100 are devices needed to use a new service in a mobile communication network. The subscriber terminals 100 are mobile terminals such as mobile phones and personal digital assistants (PDAs). The S-CSCF 200 receives a public service identity (PSI) sent by each of the subscriber terminals 100 to request a new service and, with reference to the received PSI, routes a corresponding one of the subscriber terminals 100 to the IMS application server 300 on which an application program related to the new service is installed, so that the corresponding one of the subscriber terminals 100 can use the application program. In addition, the S-CSCF 200 controls the subscriber terminals 100 to subscribe to the HSS 400 which will be described later, so that the subscriber terminals 100 can receive advertising information of new services from the HSS 400.

That is, each of the subscriber terminals 100 sends a session initiation protocol (SIP) subscription request message to the S-CSCF 200 in order to subscribe to a new service is notification event of the HSS 400. When receiving the SIP subscription request message, the S-CSCF 200 identifies information contained in the received SIP subscription request message. Based on the information contained in the received SIP subscription request message, the S-CSCF 200 sends the received SIP subscription request message to the HSS 400 so as to request the HSS 400 to allow a corresponding one of the subscriber terminals 100 to subscribe to the new service notification event. Here, the SIP subscription request message contains an identifier of a corresponding one of the subscriber terminals 100, an address of the HSS 400, and an identifier of an event (the new service notification event in the present invention) to which the corresponding one of the subscriber terminals 100 is to subscribe.

The IMS application server 300 executes an application program related to a new service that is registered with the service registration server 500 which will be described later. Accordingly, a corresponding one of the subscriber terminals 100 receives a terminal-side application program related to the new service from the IMS application server 300 and executes the received application program. Consequently, a subscriber can use the new service via his/her corresponding subscriber terminal 100.

The HSS 400 stores subscription information of the subscriber terminals 100. Here, the subscription information includes respective identifiers of the subscriber terminals 100 and service profiles needed to advertise new services to the subscriber terminals 100. Each service profile included in the subscription information is set by a subscriber using a wired or wireless terminal and includes contents desired by the subscriber, such as music and games. Service profiles may be classified into a plurality of groups at the request of a subscriber.

When receiving an SIP subscription request message from one of the subscriber terminals 100 via the S-CSCF 200, the HSS 400 checks whether any of the identifiers included in the pre-stored subscription information of the subscriber terminals 100 match an identifier contained in the SIP subscription request message. When an identifier matching the identifier contained in the SIP subscription request message is found, the HSS 400 allows the subscriber terminal, which corresponds to the identifier contained in the SIP subscription request message, to subscribe to the new service notification event of the SIP subscription request message.

Then, the HSS 400 sends advertising information of a new service, which corresponds to a service profile included in the subscription information of the subscriber terminal, to the subscriber terminal. In this way, each of the subscriber terminals 100 can display advertising information of new services desired by a subscriber on the screen thereof.

The service registration server 500 manages and registers services that are generated, modified, and terminated. When receiving a new service from a management server of a service manager, the service registration server 500 registers information related to the received new service. Then, the service registration server 500 sends the registered information (hereinafter, referred to as "new service registration information") to the HSS 400. Accordingly, the HSS 400 selects a subscriber terminal, which is related to the new service registration information, and sends advertising information of the new service to the selected subscriber terminal.

In the present invention, advertising information provided to the subscriber terminals 100 is not limited to advertising information of new services. That is, advertising information of existing services may also be provided to the subscriber terminals 100.

Hereinafter, a method and apparatus for advertising information about a newly generated service to a subscriber terminal will be described in detail with reference to FIGS. 2 through 6.

Figure 2:
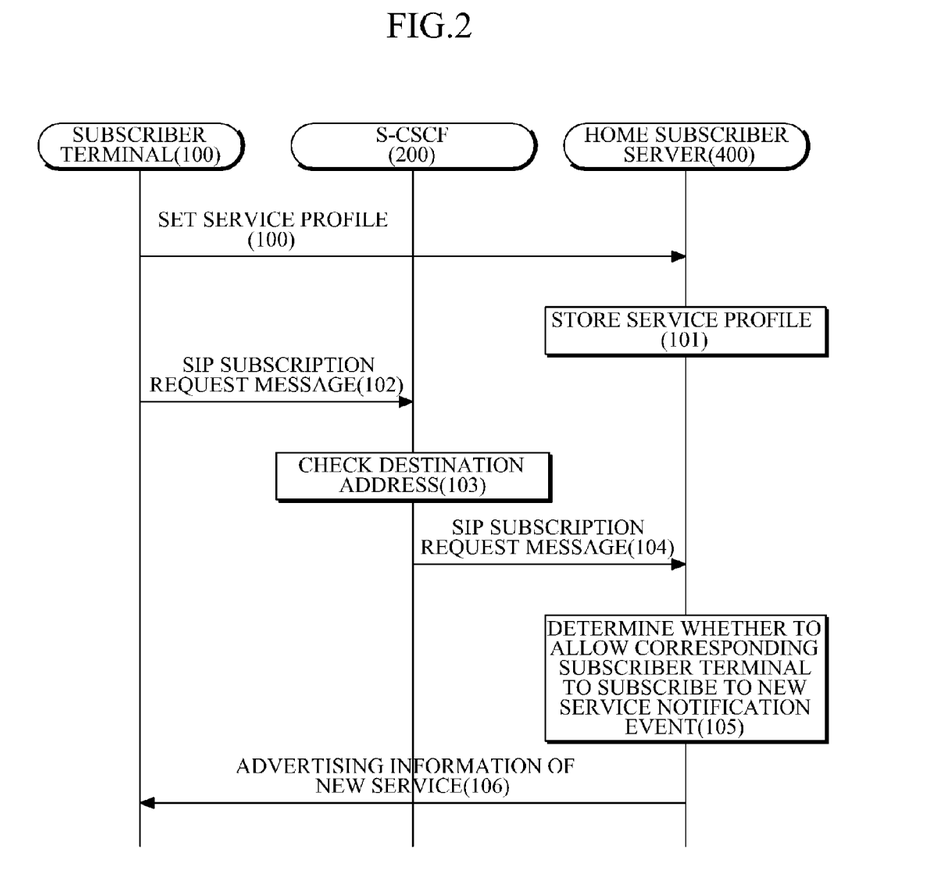
FIG. 2 is a flowchart illustrating a method of sending advertising information of a new service to a subscriber terminal according to an exemplary embodiment.

FIG. 2 is a flowchart illustrating a method of sending advertising information of a new service to a subscriber terminal according to an exemplary embodiment.

Figure 3:
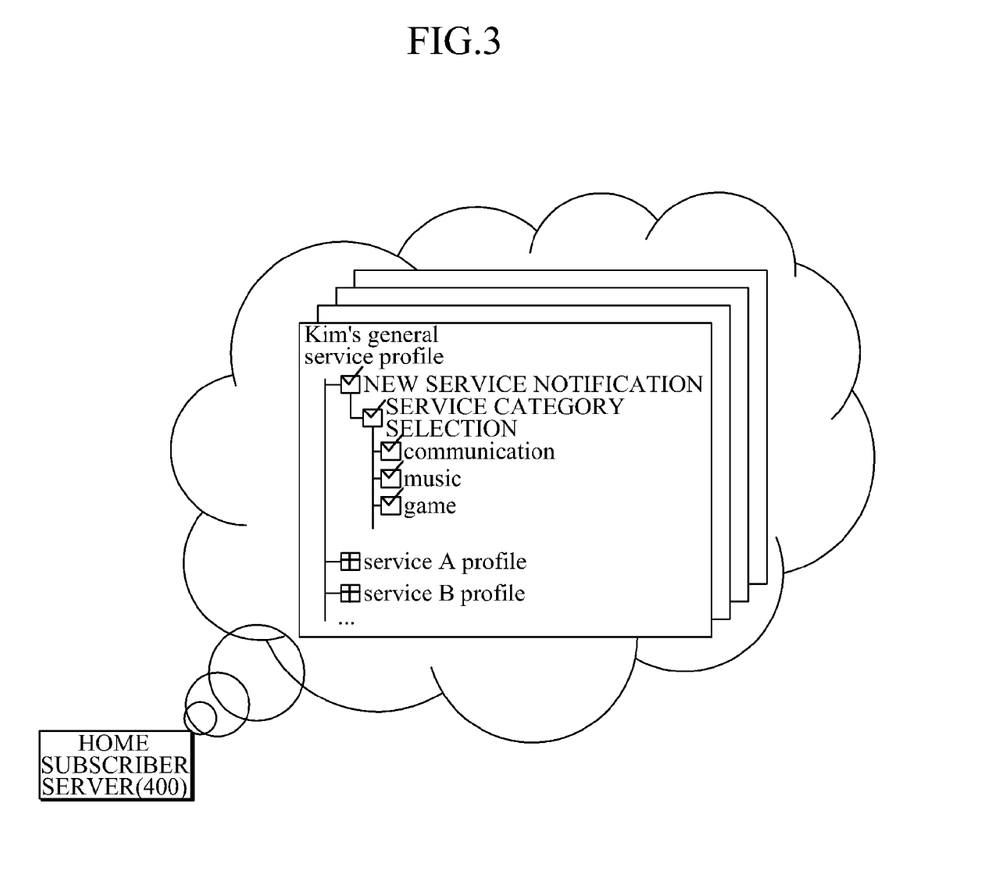
FIG. 3 is a diagram illustrating a method of setting a service profile according to an exemplary embodiment.

Referring to FIG. 2, a subscriber may set a service profile as illustrated in FIG. 3 by using his or her subscriber terminal 100 in order to receive advertising information of a new personalized service that corresponds to the set service profile. The subscriber terminal 100 is used to set a service profile may be a wired or wireless terminal.

FIG. 3 is a diagram illustrating a method of setting a service profile according to an exemplary embodiment. Referring to FIG. 3, to set a service profile, a subscriber selects desired categories such as communication, music, and game. In addition, the subscriber may select another service profile. Accordingly, the subscriber can be provided with advertising information of only desired services. Since service profiles can be grouped by similar category, they can be managed by category. The subscriber terminal 100 may set a service profile using an SIP or a hypertext transfer protocol (HTTP) and may modify or delete the set service profile. In FIG. 3, an example of setting a service profile using the HTTP is illustrated.

Referring back to FIG. 2, a service profile selected by the subscriber as described above is sent from the subscriber terminal 100 of the subscriber to the HSS 400 (operation 100). When receiving the service profile from the subscriber terminal 100 of the subscriber, the HSS 400 generates subscription information, which includes the received service profile and an identifier of the subscriber terminal 100, and stores the generated subscription information (operation 101). After setting the service profile, the subscriber terminal 100 generates an SIP subscription request message and sends the generated SIP subscription request message to the S-CSCF 200 in order to receive advertising information of new services that correspond to the set service profile (operation 102). Here, the SIP subscription request message contains an address of the destination of advertising information of new services, an address of the destination of the SIP subscription request message, and an identifier of the subscriber terminal 100.

The S-CSCF 200 obtains the address of the destination of the SIP subscription request message from the received SIP subscription request message and sends the SIP subscription request message to the obtained address (operations 103 and 104). Here, the address of the destination of the SIP subscription request message may be the address of the HSS 400.

The HSS 400 receives the SIP subscription request message from the S-CSCF 200 and checks whether any of pre-stored subscription information of a plurality of subscriber terminals is related to the received SIP subscription request message. That is, the HSS 400 checks whether any of identifiers included in the pre-stored subscription information of the subscriber terminals matches the identifier of the subscriber terminal 100 contained in the SIP subscription request message (operation 105). When an identifier matching the identifier contained in the SIP subscription request message is found, the HSS 400 allows the subscriber terminal 100, which sent the SIP subscription request message, to subscribe to the new service notification event of the SIP subscription message. Then, the HSS 400 sends the advertising information of new services to the subscriber terminal 100 with reference to the address of the destination of the advertising information contained in the SIP subscription request message (operation 106).

Accordingly, the subscriber terminal 100 can receive the advertising information of new services from the HSS 400. When receiving new service registration information from the service registration server 500 through operations which will be described later, the HSS 400 selects a subscriber terminal related to the received new service registration information and sends the new service registration information to the selected subscriber terminal.

Hereinafter, a method in which the HSS 400 receives new service registration information from the service registration server 500 and sends the received new service registration information to a subscriber terminal related to the received new service registration information will be described.

Figure 4:
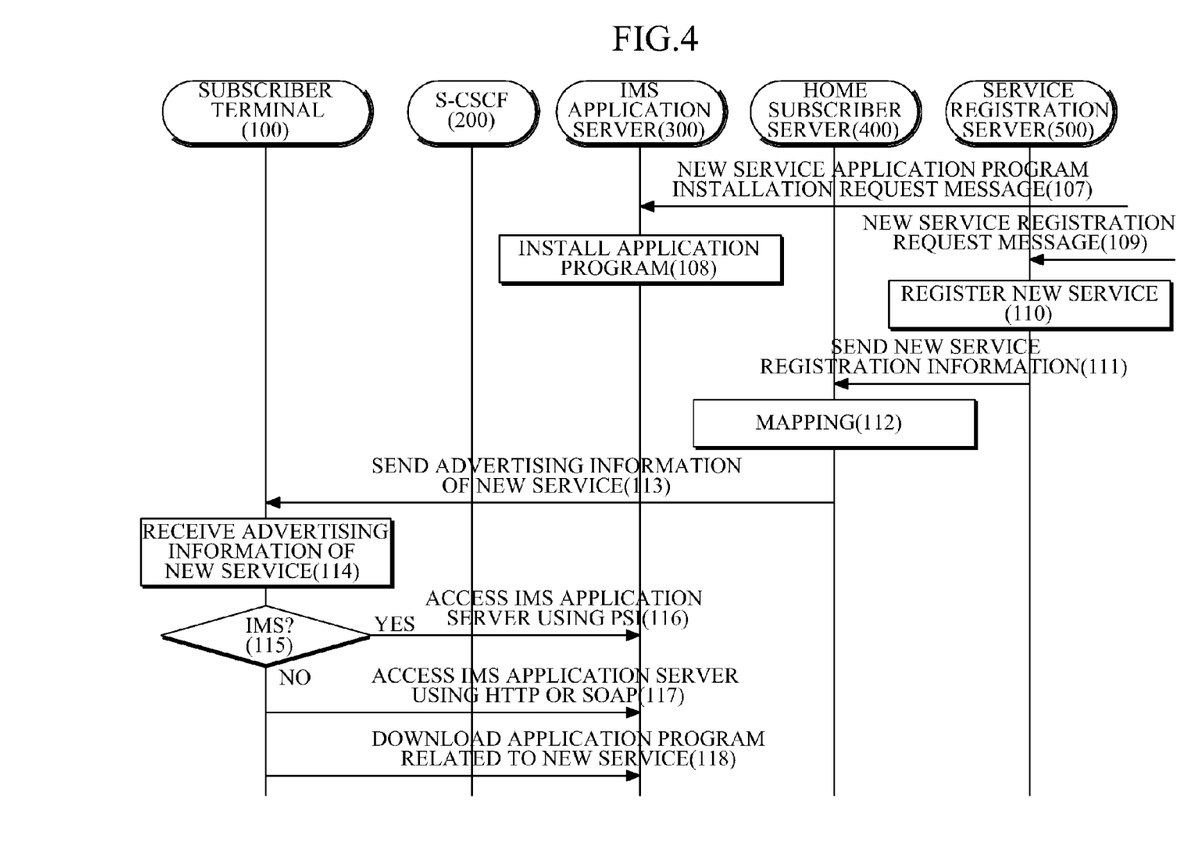
FIG. 4 is a flowchart illustrating a method of sending new service registration information to a subscriber terminal according to an exemplary embodiment.

FIG. 4 is a flowchart illustrating a method of sending new service registration information to a subscriber terminal according to an exemplary embodiment.

Referring to FIG. 4, when a new service is generated, a service manager sends an application program installation request message to the IMS application server 300 using a service management server so as to request the IMS application server 300 to install an application program related to the generated new service (operation 107). Accordingly, the IMS application server 300 installs the application program related to the new service to enable the subscriber terminals 100 to use the new service and prepares to execute the application program (operation 108). When the application program related to the new service is installed or executed on the IMS application server 300, the service manager sends a new service registration request message to the service registration server 500 using the service management server so as to request the service registration server 500 to register the new service (operation 109). Accordingly, the service registration server 500, which functions as a directory of services in an IMS service environment, registers the new service (operation 110).

That is, the service registration server 500 generates metadata of the new service and registers and stores the generated metadata. Here, the metadata of the new service includes the general definition, usage, description, category, and service owner of the new service, and service access information. Next, the service registration server 500 sends to the HSS 400 new service registration information indicating that the new service has been registered (operation 111).

Figure 5:
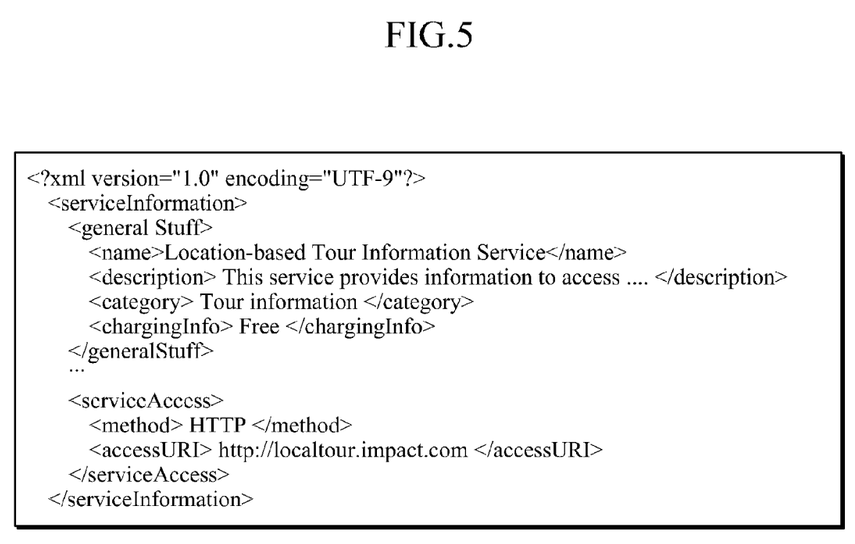
FIG. 5 illustrates new service registration information according to an exemplary embodiment.

FIG. 5 illustrates new service registration information according to an exemplary embodiment. The new service registration information illustrated in FIG. 5 is expressed in, but not limited to, an extensible markup language (XML) document.

Referring to FIG. 5, the new service registration information includes general information which includes the name, category, general description and charging information of a new service, information about a method of accessing the new service, and service termination information.

The above information included in the new service registration information may be used to provide advertising information of new services to the subscriber terminals 100.

Referring back to FIG. 4, when receiving the new service registration information, the HSS 400 analyzes the received new service registration information and maps the analyzed new service registration information to a service profile included in subscription information of a subscriber terminal that sent an SIP subscription request message or service profiles included in pre-stored subscription information of a plurality of subscriber terminals (operation 112).

In an embodiment, the HSS 400 may match the category of the new service included in the new service registration information which is received from the service registration server 500 with the category of a service profile included in the subscription information of the subscriber terminal that sent the SIP subscription request message or the categories of service profiles included in the pre-stored subscription information of the subscriber terminals. However, the present invention is not limited to the above embodiment, and the HSS 400 may also perform the matching operation using keywords.

When subscriber terminals related to the new service registration information are extracted as a result of the mapping operation, the HSS 400 selects a subscriber terminal, which is subscribed to the new service notification event, from the extracted subscriber terminals and sends advertising information of the new service to the selected subscriber terminal with reference to an address of the selected subscriber terminal (operation 113). Accordingly, the selected subscriber terminal receives the advertising information of the new service which corresponds to the set service profile (operation 114).

After receiving the advertising information of the new service, the selected subscriber terminal accesses the IMS application server 300 with reference to the received advertising information of the new service and then accesses an application service of the new service which is installed on the IMS application server 300. In an embodiment, when the application service is an IMS-based application service, the subscriber terminal accesses the IMS application server 300 using an SIP PSI of the received advertising information (operations 115 and 116).

When the application service is not an IMS-based application service, that is, when the is application service is a content-based service, the subscriber terminal accesses the IMS application server 300 using an HTTP uniform resource identifier (URI) of the received advertising information (operation 117). In addition, when the application service is not an IMS-based service, that is, when the application service is provided in the form of a web service, the subscriber terminal 100 calls a web service using a simple object protocol (SOAP) URI. Then, the subscriber terminal downloads a terminal-side application program related to the received advertising information of the new service from the IMS application server 300 or uses the functions of the new service through the called web service (operation 118).

After the application program is downloaded on the subscriber terminal, a subscriber can use the new service using the subscriber terminal. In this way, the subscriber can be provided with new services that correspond to a service profile set by the subscriber.

Hereinafter, an apparatus for advertising a new service to a subscriber terminal will be described in detail. The configuration of the apparatus described below may be identical to that of the HSS 400 described above.

Figure 6:
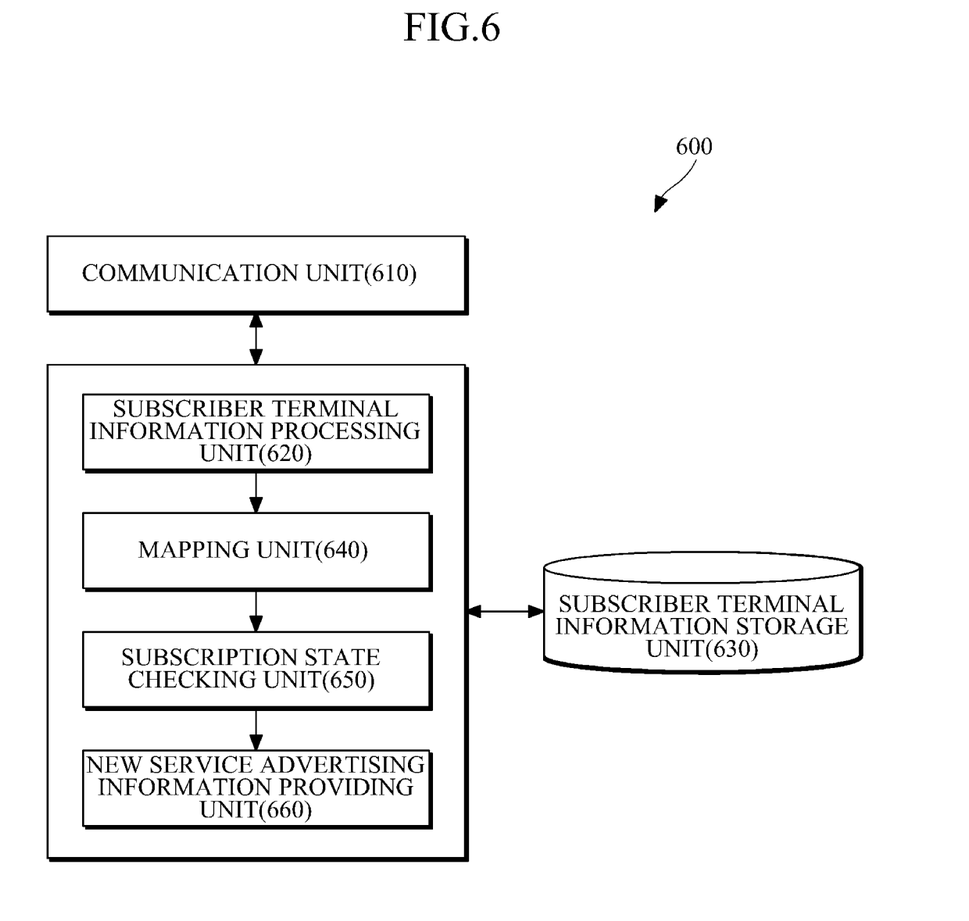
FIG. 6 is a block diagram of an apparatus for advertising a new service according to an exemplary embodiment.

FIG. 6 is a block diagram of an apparatus 600 for advertising a new service according to an exemplary embodiment.

Referring to FIG. 6, the apparatus 600 includes a communication unit 610, a subscriber terminal information processing unit 620, a subscriber terminal information storage unit 630, a mapping unit 640, a subscription state checking unit 650, and a new service advertising information providing unit 660.

The communication unit 610 communicates with the subscriber terminals 100, the S-CSCF 200, the IMS application server 300, and the service registration server 500 illustrated in FIG. 1. The subscriber terminal information storage unit 630 stores subscription information that includes service profiles of the subscriber terminals 100.

The subscriber terminal information processing unit 620 stores the subscription information, which includes the service profiles set by the subscriber terminals 100, in the subscriber terminal information storage unit 630. Here, each service profile includes a plurality of categories, and service profiles are classified into a plurality of groups by the subscriber terminals 100. The subscriber terminals 100 used to set service profiles may be wired or wireless terminals.

That is, to set a service profile, a subscriber selects desired categories (such as communication, music, and games) using his or her subscriber terminal, as illustrated in FIG. 3. In addition, the subscriber may select another service profile. Accordingly, the subscriber can be provided with advertising information of only desired services. Since service profiles can be grouped by similar category and set accordingly, they can be managed by category. Each of the subscriber terminals 100 may set a service profile using an SIP or an HTTP and modify or delete the set service profile.

A service profile selected by a subscriber as described above is sent from a subscriber terminal of the subscriber to the apparatus 600. When the apparatus 600 receives the service profile from the subscriber terminal of the subscriber, the subscriber terminal information processing unit 620 generates subscription information, which includes an identifier of the subscriber terminal, and stores the generated subscription information in the subscriber terminal information storage unit 630.

When receiving new service registration information indicating that a new service has been registered, the mapping unit 640 maps the received new service registration information to the service profiles included in the subscription information of the subscriber terminals 100 which is stored in the subscriber terminal information storage unit 630. Here, the service registration information includes general information which contains the name, category, description, and charging information of the new service, usage information, service owner information, and service access information.

That is, when a new service is generated, a service manager sends an application program installation request message to the IMS application server 300 using the service registration server 500 so as to request the IMS application server 300 to install an application program related to the new service. Accordingly, the IMS application server 300 installs the application program related to the new service, so that a corresponding one of the subscriber terminals 100 can use the new service.

After the IMS application server 300 installs or executes the application program related to the new service, the service manager sends a new service registration request message to the service registration server 500 using a service management server so as to request the service registration server 500 to register the new service. Accordingly, the service registration server 500 registers the new service. That is, the service registration server 500 generates metadata of the new service and registers and stores the generated metadata. The metadata of the new service includes the general definition, usage, description, category, and service owner of the new service, and service access information.

Next, the service registration server 500 sends to the apparatus 600 new service registration information indicating that the new service has been registered. The new service registration information sent to the apparatus 600 may be generated as described above with reference to FIG. 5. When receiving the new service registration information, the mapping unit 640 maps the received new service registration information to the service profiles included in the subscription information of the subscriber terminals 100, the subscription information being stored in the subscriber terminal information storage unit 630.

In an embodiment, the mapping unit 640 may match the category of the new service included in the new service registration information which is received from the service registration server 500 with the categories of the service profiles included in the subscription information of the subscriber terminals 100 which is stored in the subscriber terminal information storage unit 630. However, the present invention is not limited to the above embodiment, and the mapping unit 640 may also perform the matching operation using keywords.

The mapping unit 640 may map the received new service registration information to the service profiles of all of the subscriber terminals 100 which are stored in the subscriber terminal information storage unit 630 or service profiles of the subscriber terminals 100 which are registered with the apparatus 600. A description of the present invention is based on the assumption that the received new service registration information is mapped to the service profiles of all of the subscriber terminals 100 which are stored in the subscriber terminal information storage unit 630.

When subscriber terminals related to the new service registration information are selected as a result of the mapping operation, the subscription state checking unit 650 selects a subscriber terminal which is currently subscribed to the apparatus 600, from the selected subscriber terminals. Then, advertising information of the new service is sent to the selected subscriber terminal.

Specifically, when the mapping unit 640 selects a subscriber terminal related to the new service registration information, the subscription state checking unit 650 checks whether the selected subscriber terminal is subscribed to the apparatus 600. When the subscription state checking unit 650 determines that the selected subscriber terminal is subscribed to the apparatus 600, the new service advertising information providing unit 660 sends the advertising information of the new service, which is related to the new service registration information, to the selected subscriber terminal by referring to the subscription information of the selected subscriber terminal.

The subscriber terminals 100 may subscribe to the apparatus 600 using an SIP subscription request message. Specifically, each of the subscriber terminals 100 sets a service profile and then requests the apparatus 600 to allow it to subscribe thereto in order to receive advertising information of new services that correspond to the set service profile. That is, each of the subscriber terminals 100 generates an SIP subscription request message and sends the generated SIP subscription request message to the S-CSCF 200.

Then, the S-CSCF 200 sends the received SIP subscription request message to the apparatus 600 with reference to information contained in the received SIP subscription request message. When receiving the SIP subscription request message, the apparatus 600 identifies a subscriber terminal related to the SIP subscription request message by referring to the subscription information of the subscriber terminals 100 which is stored in the subscriber terminal information storage unit 630 and allows the identified subscriber terminal to subscribe to the new service advertising event. Accordingly, the identified subscriber terminal can subscribe to the apparatus 600 and thus receive advertising information of a new service from the new service advertising information providing unit 660.

Then, the identified subscriber terminal accesses the IMS application server 300 with reference to the received advertising information of the new service, downloads an application program related to the received advertising information of the new service from the IMS application server 300, and installs the downloaded application program. Therefore, a subscriber utilizing the identified subscriber terminal can access and use the new service.

As described above, in a method and apparatus for advertising a service in a personalized manner in a next-generation communication network according to the present invention, when a new service is generated in a next-generation communication service environment, it is advertised in a personalized manner to those subscribers who are suitable for the new service by considering the situations, preferences, and dispositions of a plurality of subscribers. Therefore, the development of personalized services can be promoted, and the use of services can be stimulated.

While this invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. A method of advertising a new service, the method comprising:
   receiving new service registration information, which indicates that a new service has been registered, from a service registration server;
   mapping the received new service registration information to service profiles included in pre-stored subscription information of a plurality of subscriber terminals and identifying service profiles for the new registration service via the subscriber terminals, and selecting a subscriber terminal which is related to the new service registration information based on the profiles; and
   identifying whether the selected subscriber terminal is subscribed to a new service notification event of a home subscriber server and sending advertising information of personalized service, which is related to the set service profiles and the new service registration information, to the selected subscriber terminal with reference to subscription information of the selected subscriber terminal,
   wherein each of service profiles comprises a plurality of categories related to subscribers' interest relating situations, preferences, and dispositions, and the service profiles are grouped by similar category by the subscriber terminals and stored accordingly in the subscriber terminal.

2. The method of claim 1, wherein the new service registration information comprises general information which comprises the name, category, description, and charging information of the new service, usage information, service owner information, and service access information.

3. The method of claim 2, wherein each of the subscriber terminals sets a service profile using a session initiation protocol (SIP) or a hypertext transfer protocol (HTTP).

4. The method of claim 2, wherein each of the subscriber terminals deletes or updates a service profile which was set using the SIP or the HTTP.

5. The method of claim 2, wherein in the mapping of the received new service registration information, the category of the new service included in the general information of the new service registration information is matched with categories included in the service profiles which are included in the pre-stored subscription information of the subscriber terminals.

6. The method of claim 2, wherein the service access information of the new service registration information comprises access information for an Internet protocol multimedia subsystem (IMS)-based application service and access information for a non-IMS-based application service, wherein, in case of the IMS-based application service, the subscriber terminal which receives the advertising information of the new service accesses an IMS application server using an SIP public service identity (PSI) and uses a service related to the advertising information of the new service.

7. The method of claim 2, wherein the service access information of the new service registration information comprises access information for an IMS-based application service and access information for a non-IMS-based application service, wherein, in case of the non-IMS-based application service, the subscriber terminal which receives the advertising information of the new service accesses the IMS application server using an HTTP uniform resource identifier (URI) and downloads an application program of the new service which is installed on the IMS application server.

8. The method of claim 2, wherein the service access information of the new service registration information comprises access information for an IMS-based application service and access information for a non-IMS-based application service, wherein, in case of the non-IMS-based application service, the subscriber terminal which receives the advertising information of the new service calls a web service using a simple object protocol (SOAP) URI and uses the new service.

9. An apparatus for advertising a new service, the apparatus comprising:
- a subscriber terminal information processing unit stored in a memory and executed by a processor storing subscription information, which comprises service profiles set by a plurality of subscriber terminals, in a subscriber terminal information storage unit;
- a mapping unit stored in the memory and executed by the processor receiving new service registration information, which indicates that a new service has been registered, from a service registration server and mapping the received new service registration information to the service profiles included in the subscription information of the subscriber terminals, and identifying service profiles for the new registration service via the subscriber terminals, the subscription information being stored in the subscriber terminal information storage unit;
- a subscription state checking unit stored in the memory and executed by the processor selecting a subscriber terminal based on the profiles which is related to the new service registration information and checking whether the selected subscriber terminal is subscribed to a new service notification event; and
- a new service advertising information providing unit stored in the memory and executed by the processor sending advertising information of personalized service, which is related to the set service profiles and the new service registration information, to the selected subscriber terminal with reference to subscription information of the selected subscriber terminal when the subscription state checking unit determines that the selected subscriber terminal is subscribed to the new service notification event,
- wherein service profiles comprise a plurality of categories related to subscribers' interest relating situations, preferences, and dispositions, and the service profiles are grouped by similar category by the subscriber terminals and stored accordingly in the subscriber terminal information storage unit.

10. The apparatus of claim 9, wherein the new service registration information comprises general information which comprises the name, category, description, and charging information of the new service, usage information, service owner information, and service access information.

11. The apparatus of claim 10, wherein each of the subscriber terminals sets a service profile using an SIP or an HTTP and deletes or updates the set service profile.

12. The apparatus of claim 10, wherein the mapping unit matches the category of the new service included in the general information of the new service registration information with categories included in the service profiles which are included in the stored subscription information of the subscriber terminals.

* * * * *